US010914618B2

United States Patent
Li et al.

(10) Patent No.: US 10,914,618 B2
(45) Date of Patent: Feb. 9, 2021

(54) READOUT CIRCUIT FOR SENSOR AND READOUT METHOD THEREOF

(71) Applicant: Industrial Technology Research Institute, Hsinchu (TW)

(72) Inventors: Sih-Han Li, New Taipei (TW);
Chih-Sheng Lin, Tainan (TW);
Ya-Wen Yang, Taichung (TW);
Kuan-Wei Chen, Taichung (TW);
Shyh-Shyuan Sheu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 489 days.

(21) Appl. No.: 15/851,609

(22) Filed: Dec. 21, 2017

(65) Prior Publication Data
US 2019/0154473 A1    May 23, 2019

(30) Foreign Application Priority Data

Nov. 23, 2017    (TW) .............................. 106140642 A

(51) Int. Cl.
*G01D 18/00*    (2006.01)
*G01D 3/02*    (2006.01)

(52) U.S. Cl.
CPC .............. *G01D 18/00* (2013.01); *G01D 3/02* (2013.01)

(58) Field of Classification Search
CPC ........ G01D 18/00; G01D 3/02; H04N 5/2327; G05B 2219/37509
See application file for complete search history.

(56) References Cited

U.S. PATENT DOCUMENTS

| 7,375,748 | B2 | 5/2008 | Krymski |
| 7,663,379 | B2 | 2/2010 | Nehrig et al. |
| 7,986,317 | B2* | 7/2011 | Kim ..................... G09G 3/3225 345/212 |
| 8,175,386 | B2* | 5/2012 | Kim ....................... H04N 1/407 358/464 |

(Continued)

FOREIGN PATENT DOCUMENTS

| TW | 412708 | 11/2000 |
| TW | I484194 | 5/2015 |
| TW | I497997 | 8/2015 |

OTHER PUBLICATIONS

"Office Action of Taiwan Counterpart Application", dated Apr. 13, 2018, p. 1-p. 4, in which the listed reference was cited.

(Continued)

*Primary Examiner* — Dinh T Le
(74) *Attorney, Agent, or Firm* — JCIPRNET

(57) ABSTRACT

A readout circuit for a sensor and a readout method thereof are provided. The readout circuit includes a reference circuit, a compensated circuit, and a signal processing circuit. The reference circuit provides a direct current (DC) signal. The compensated circuit is coupled to the reference circuit. The compensated circuit obtains an analog sensing signal of the sensor, obtains the DC signal from the reference circuit, and provides a compensated signal according to the analog sensing signal and the DC signal. The signal processing circuit is coupled to the compensated circuit. The signal processing circuit processes the compensated signal to convert the compensated signal into a digital sensing signal. The compensated circuit subtracts the DC signal from the analog sensing signal to provide the compensated signal.

16 Claims, 7 Drawing Sheets

(56) References Cited

U.S. PATENT DOCUMENTS

| | | | |
|---|---|---|---|
| 8,586,940 B2 | 11/2013 | Lee et al. | |
| 8,749,670 B1 * | 6/2014 | Liu | H04N 5/361 |
| | | | 348/243 |
| 9,041,842 B2 | 5/2015 | Willassen | |
| 9,074,954 B2 | 7/2015 | Tseng et al. | |
| 9,116,049 B2 * | 8/2015 | Sanchez | G01K 7/01 |
| 9,170,308 B2 | 10/2015 | Raman et al. | |
| 2016/0366351 A1 | 12/2016 | Ryu et al. | |

OTHER PUBLICATIONS

Balaji Jayaraman, et al., "High Precision 16-bit Readout Gas Sensor Interface in 0.13μm CMOS," IEEE International Symposium on Circuits and Systems, May 2007, pp. 3071-3074.

Alessandro Depari, et al., "A New and Fast-Readout Interface for Resistive Chemical Sensors," IEEE Transactions on Instrumentation and Measurement, vol. 59, Issue 5, May 2010, pp. 1276-1283.

Wan-Jun Lin, et al., "A Novel Readout Circuit for an OTFD Gas Sensor with a New Front-end Trans-impedance Amplifier," IEEE Sensors, Oct. 2011, pp. 1-4.

Mehrdad A. Ghanad, et al., "A 15 μW 5.5 kS/s Resistive Sensor Readout Circuit with 7.6 ENOB," IEEE Transactions on Circuits and Systems I: Regular Papers, vol. 6, Issue 12, Dec. 2014, pp. 3321-3329.

Trong-Hieu Tran, et al., "A Fast Readout Circuit for an Organic Vertical Nano-Junction Sensor," IEEE Sensors, Oct. 30-Nov. 3, 2016, pp. 1-3.

Fan Ren, "ZnO Nanowires for Sensing and Device Applications," Chemical Engineering at the University of Florida, retrieved on Jan. 16, 2018, Available at: http://www.che.ufl.edu/ren/Zno.htm.

* cited by examiner

READOUT CIRCUIT FOR SENSOR AND READOUT METHOD THEREOF

CROSS-REFERENCE TO RELATED APPLICATION

This application claims the priority benefit of Taiwan application serial no. 106140642, filed on Nov. 23, 2017. The entirety of the above-mentioned patent application is hereby incorporated by reference herein and made a part of this specification.

BACKGROUND OF THE DISCLOSURE

Field of the Disclosure

The disclosure relates to a signal processing technique for a sensor, and particularly relates to a readout circuit for a sensor capable easily obtaining an alternating current (AC) part of a sensing signal and a readout method thereof.

Description of Related Art

Sensor is a component or device capable of measuring a specific physical quantity (for example, a temperature, humidity, a light intensity, a gas content, etc.) and converting a measured result into an output signal. Moreover, based on different presenting methods of different sensors for different specific physical quantities, the sensors may be divided into resistive sensors, capacitive sensors, inductive sensors, etc.

If sensitivity of the sensor is poor, a change of the sensed physical quantity is very weak, and a sensing value of the sensor has a tiny change, such that it is not easy to read an accurate sensing signal and is hard to accurately determine a value of the sensing signal. A readout circuit of the sensor has a voltage upper limit for signal transmission, and not all of the readout circuits of each sensor adopt a full-bridge circuit to read the sensing signal. If the readout circuit directly amplifies the sensing signal by several times, the amplified sensing signal probably directly reaches the voltage upper limit to reach signal saturation, such that it is hard to obtain an accurate sensing value. On the other hand, the sensing signal generally includes a direct current (DC) part and an alternating current (AC) part, and if the DC part is larger to make the AC part to only produce a tiny change, a variation amount (the AC part) of the sensing signal is also hard to be captured and detected.

Therefore, how to improve the sensitivity of the sensors is the problem to be resolved by manufactures.

SUMMARY OF THE DISCLOSURE

The disclosure is directed to a readout circuit for a sensor and a readout method thereof, by which sensitivity of the sensor is improved by way of subtracting a DC signal (for example, a DC power or a DC voltage) from a sensing signal.

An embodiment of the disclosure provides a readout circuit for a sensor, the readout circuit includes a reference circuit, a compensated circuit, and a signal processing circuit. The reference circuit provides a DC signal. The compensated circuit is coupled to the reference circuit. The compensated circuit obtains an analog sensing signal of the sensor, obtains the DC signal from the reference circuit, and provides a compensated signal according to the analog sensing signal and the DC signal. The signal processing circuit is coupled to the compensated circuit. The signal processing circuit processes the compensated signal to convert the compensated signal into a digital sensing signal. The compensated circuit subtracts the DC signal from the analog sensing signal to provide the compensated signal.

An embodiment of the disclosure provides a readout method for a sensor, which is adapted to a readout circuit for the sensor. The readout method includes following steps. A DC signal is obtained from a reference circuit in the readout circuit. An analog sensing signal of the sensor is obtained. A compensated signal is provided according to the analog sensing signal and the DC signal, wherein the compensated signal is obtained by subtracting the DC signal from the analog sensing signal. The compensated signal is processed and converted into a digital sensing signal.

According to the above description, the readout circuit for the sensor and the readout method thereof provided by the embodiment of the disclosure may improve sensing signal sensitivity of the sensor by way of subtracting the DC signal (for example, a DC power or a DC voltage) from the sensing signal provided by the sensor. Regarding the DC signal, a feedback circuit obtains a DC part of the sensing signal obtained by the readout circuit under a state of not detecting a physical quantity (which is referred to as "non-detecting state") in an initial setting phase of the readout circuit, and the DC signal is modified according to a feedback signal produced by the feedback circuit, so as to intuitively and effectively subtract the DC part from the sensing signal. Moreover, a mask electrical element having a same electrical value with the sensor under the non-detecting state and its accompanying clamp readout circuit may also be adopted to obtain the DC part of the sensing signal. Alternatively, a capacitor is used for temporarily storing the DC signal, and a switch connected to the capacitor is controlled to subtract the DC signal from the sensing signal. In other words, the embodiment of the disclosure provides three implementations to let the readout circuit to subtract the DC signal from the sensing signal in advance, so as to obtain the sensing signal with the obvious AC part, and accordingly improve the sensitivity of the sensor.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
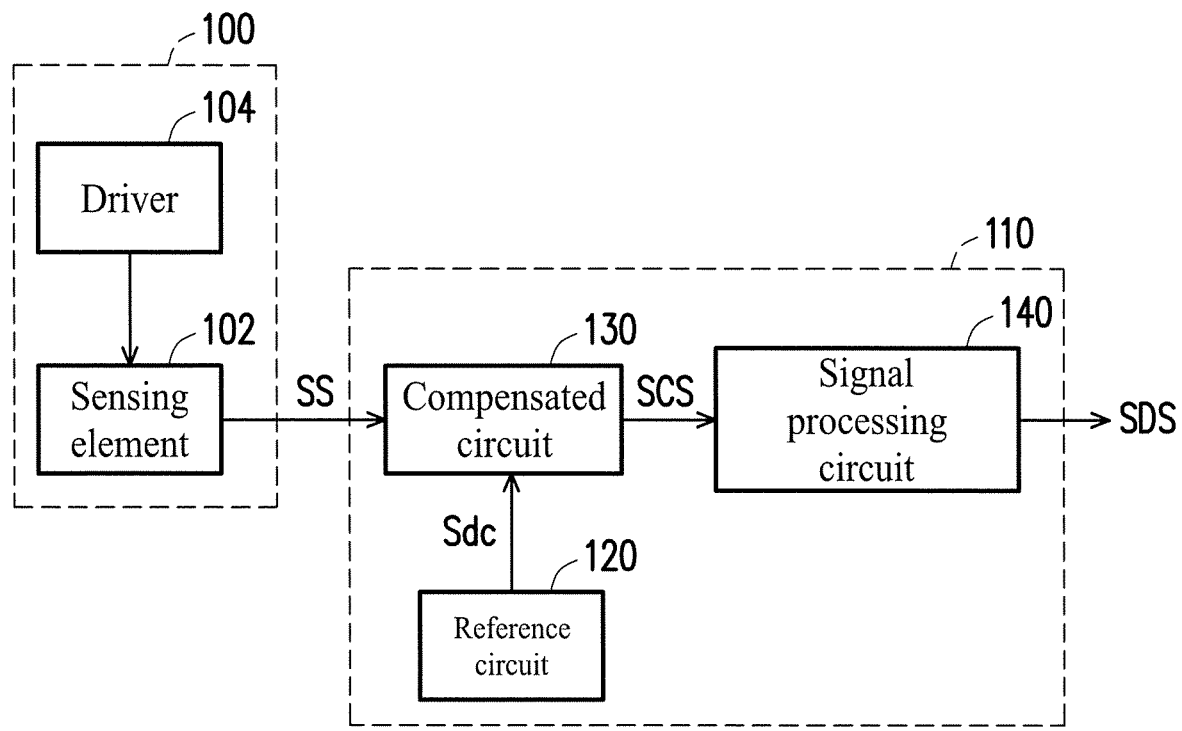
FIG. 1 is a functional block diagram of a sensor and a readout circuit thereof according to an embodiment of the disclosure.

FIG. 1 is a functional block diagram of a sensor 100 and a readout circuit 110 thereof according to an embodiment of the disclosure. The sensor 100 may be a component or a device capable of measuring a specific physical quantity (for example, a temperature, humidity, a light intensity, a gas content, etc.) and converting a measured result into an output signal. The sensor 100 includes a sensing element 102 and a driver 104. The sensing element 102 may be a resistive sensing element, a capacitive sensing element, an inductive sensing element, etc., and the circuit of the driver 104 may be different according to the different type of the sensing element 102. For example, the sensor 100 of the present embodiment may be a resistive hydrogen ($H_2$) sensor. The sensing element 102 may be equivalent to a variable resistor, and a resistance value of the variable resistor may be self-adjusted according to the content of hydrogen in the ambient environment. Namely, an electrical value of the resistive sensor may be presented through a resistance value ($R-\Delta R$). The driver 104 may be implemented by a clamp readout circuit or a current source. The sensor 100 may provide an analog sensing signal SS to the readout circuit 110.

The readout circuit 110 may include a reference circuit 120, a compensated circuit 130 and a signal processing circuit 140. The reference circuit 120 provides a DC signal Sdc to the compensated circuit 130. The compensated circuit 130 is coupled to the reference circuit 120. The compensated circuit 130 obtains the analog sensing signal SS of the sensor 100, obtains the DC signal Sdc from the reference circuit 120, and provides a compensated signal SCS according to the analog sensing signal SS and the DC signal Sdc. The signal processing circuit 140 is coupled to the compensated circuit 130. The signal processing circuit 140 processes the compensated signal SCS to convert the compensated signal SCS into a digital sensing signal SDS. It should be noted that, the compensated circuit 130 subtracts the DC signal Sdc from the analog sensing signal SS to provide the compensated signal SCS, and provides the same to the signal processing circuit 140.

The disclosure provides three implementations of the readout circuit 100, which are respectively described below. Those skilled in the art may properly adjust functions or structures of a part of the circuits according to the above implementations, and the disclosure is not limited to the above three implementations.

Figure 2:
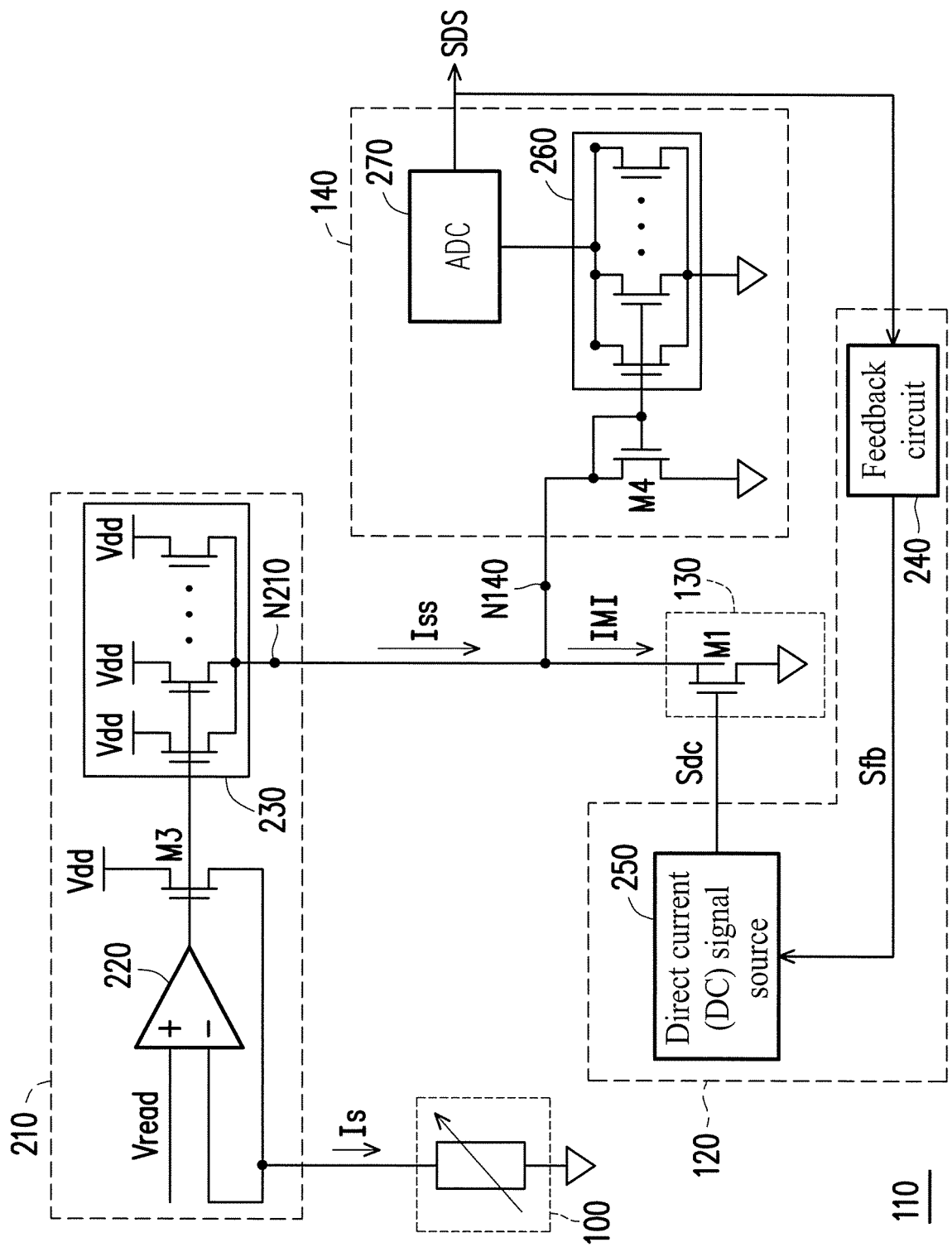
FIG. 2 is a circuit diagram of a readout circuit according to a first embodiment of the disclosure.

FIG. 2 is a circuit diagram of the readout circuit 110 according to a first embodiment of the disclosure. Besides the reference circuit 120, the compensated circuit 130 and the signal processing circuit 140, the readout circuit 110 further includes a clamp readout circuit 210. The clamp readout circuit 210 is coupled to the compensated circuit 130 and the sensor 100. Besides serving as a driving circuit of the sensor 100, the clamp readout circuit 210 further obtains a sensing current Is from the sensor 100, and amplifies the sensing current Is to produce a sensing current Iss. In the present embodiment, the sensing current Iss is taken as the analog sensing signal SS.

The clamp readout circuit 210 includes an operational amplifier 220, a third transistor M3 and a first current amplifier 230. A non-inverting input terminal of the operational amplifier 220 receives a readout voltage Vread, and an inverting input terminal of the operational amplifier 220 is coupled to one end of the sensor 100. Another end of the sensor is coupled to ground. The third transistor M3 is a P-type metal oxide semiconductor field effect transistor. A control terminal (a gate) of the third transistor M3 is coupled to an output terminal of the operational amplifier 220. A first terminal (a source) of the third transistor M3 receives a power voltage Vdd. A second terminal (a drain) of the third transistor M3 is coupled to the inverting input terminal of the operational amplifier 220 to obtain the sensing current Is. According to another aspect, the third transistor M3 may be referred to as a current source of the sensor 100. The first current amplifier 230 may be composed of a plurality of P-type transistor. Control terminals (gates) of each of the P-type transistors in the first current amplifier 230 are coupled to the control terminal of the third transistor M3. First terminals (sources) of each of the P-type transistors in the first current amplifier 230 are coupled to the power voltage Vdd. In this way, the third transistor M3 and the first current amplifier 230 form a current mirror (which is referred to as a second current mirror in the present embodiment), such that the sensing current Is forms the amplified sensing current Iss (the analog sensing signal SS) according to an amplification factor (the amplification factor is calculated according to a quantity or width ratio of the transistor M3 and the P-type transistors in the first current amplifier 230). "An amplification factor A" is taken as the amplification factor of the first current amplifier 230.

Equations are provided below to describe the sensing current Is (equation (1)) and the sensing current Iss (equation (2)):

$$Is = \frac{Vread}{(R - \Delta R)} \quad (1)$$

$$Iss = A \times Is = A \times \frac{Vread}{(R - \Delta R)} \quad (2)$$

The compensated circuit 130 includes a first transistor M1. The first transistor M1 is implemented by an N-type metal oxide semiconductor field effect transistor (MOSFET). A control terminal (a gate) of the first transistor M1 receives the DC signal Sdc. A first terminal (a drain) of the first transistor M1 is coupled to an output terminal N210 of the clamp readout circuit 210 and an input terminal N140 of the signal processing circuit 140. A second terminal (a source) of the first transistor M1 is coupled to the ground. The clamp readout circuit 210 provides the sensing current Iss (the analog sensing signal SS) to the first terminal (the drain) of the first transistor M1. The first transistor M1 produces a DC current IM1 flowing from the first terminal (the drain) to the second terminal (the source) thereof to serve as the DC signal Sdc. The input terminal N140 of the signal processing circuit 140 receives a compensation current Ics to serve as the compensated signal SCS. In other words, a value of the compensation current Ics (the compensated signal SCS) is equal to a value obtained by subtracting the DC current IM1 (the DC signal Sdc) from the sensing current Iss (the analog sensing signal SS). Namely, the DC signal Sdc is equivalent to a DC part of the sensing signal obtained by the sensor 100 under a state of not detecting a physical quantity (which is referred to as a "non-detecting state"). According to another aspect, a resistance value of the sensor in the non-detecting state is a resistance value R.

The reference circuit 120 of FIG. 2 includes a feedback circuit 240 and a DC signal source 250. A DC voltage source is taken as the DC signal source 250, and those skilled in the art may also take a DC current source as the DC signal source. In order to make the reference circuit 120 to generate the proper DC current IM1 to remove the DC part in the sensing signal SS, in the embodiment of FIG. 2, the feedback circuit 240 is applied to identify the DC part of the digital sensing signal SDS, and generate a feedback signal Sfb according to a value of the DC part. The DC voltage source 250 coupled to the compensated circuit 130 is controlled by the feedback signal Sfb to generate a DC voltage to serve as the DC signal Sdc. In this way, through the DC voltage source 250 adapted to be adjusted by the feedback circuit 240, the DC part in the sensing signal Iss is removed, and through proper amplification of the signal processing circuit 140, the AC part of the sensor 100 may be amplified, i.e. the sensitivity of the sensor is amplified. In the present embodiment, the feedback circuit 240 identifies the DC part of the digital sensing signal SDS in an initial setting phase of the readout circuit 110, and provides the feedback signal Sfb according to the DC part. In other phases of the readout circuit 110, the value of the feedback signal Sfb is not changed along with a change of the digital sensing signal SDS, such that the readout circuit 110 still maintains the values of the DC current IM1 and the DC signal Sdc in an actual operation phase.

The signal processing circuit 140 may include a fourth transistor M4, a second current amplifier 260 and an analog-to-digital converter (ADC) 270. The fourth transistor M4 is implemented by an N-type MOSFET. A first terminal (a drain) and a control terminal (a gate) of the fourth transistor M4 are coupled to the compensated circuit 130 to obtain the compensation current Ics (the compensated signal SCS). A second terminal of the fourth transistor M4 is coupled to the ground. The second current amplifier 260 has a plurality of N-type MOSFETs. Control terminals (gates) of the N-type MOSFETs in the second current amplifier 260 are coupled to the control terminal (the gate) of the fourth transistor M4, and second terminals (sources) of the N-type MOSFETs are coupled to the ground. In this way, the fourth transistor M4 and the N-type MOSFETs in the second current amplifier 260 form a current mirror (which is referred to as a third current mirror in the present embodiment), so as to produce an amplified compensation current Icsa according to the compensation current Ics (the compensated signal SCS) to serve as the amplified compensated signal. The ADC 270 coupled to the second current amplifier 260 generates the digital sensing signal SDS according to the amplified compensated signal. "An amplification factor B" is taken as the amplification factor of the second current amplifier 260.

Equations are provided below to describe the DC current IM1, the compensation current Ics and the amplified compensation current Icsa. In an equation (3), the DC current IM1 may be equivalent to the DC part of the digital sensing signal SDS in case of the non-detecting state of the sensor (i.e. the resistance value of the sensor R is R). Therefore, the value of the DC current IM1 is shown as follows.

$$IM1 = A \times \frac{Vread}{R} \quad (3)$$

Moreover, since the compensation current Ics is obtained by subtracting the DC current IM1 from the sensing current Iss, the compensation current Ics may be represented by an equation (4):

$$Ics = Iss - IM1 = A \times \frac{Vread}{(R - \Delta R)} - A \times \frac{Vread}{R} = A \times \frac{Vread \times \Delta R}{(R - \Delta R)R} \quad (4)$$

The amplified compensation current Icsa may be represented by an equation (5):

$$Icsa = B \times Iss = AB \times \frac{Vread \times \Delta R}{(R - \Delta R)R} \quad (5)$$

In this way, it is known that the amplified compensation current Icsa may improve the sensitivity of the sensor 100 as two current amplifiers 230 and 260 are applied to directly amplify a resistance variation amount/the AC part (ΔR) of the sensor 100.

Figure 3:
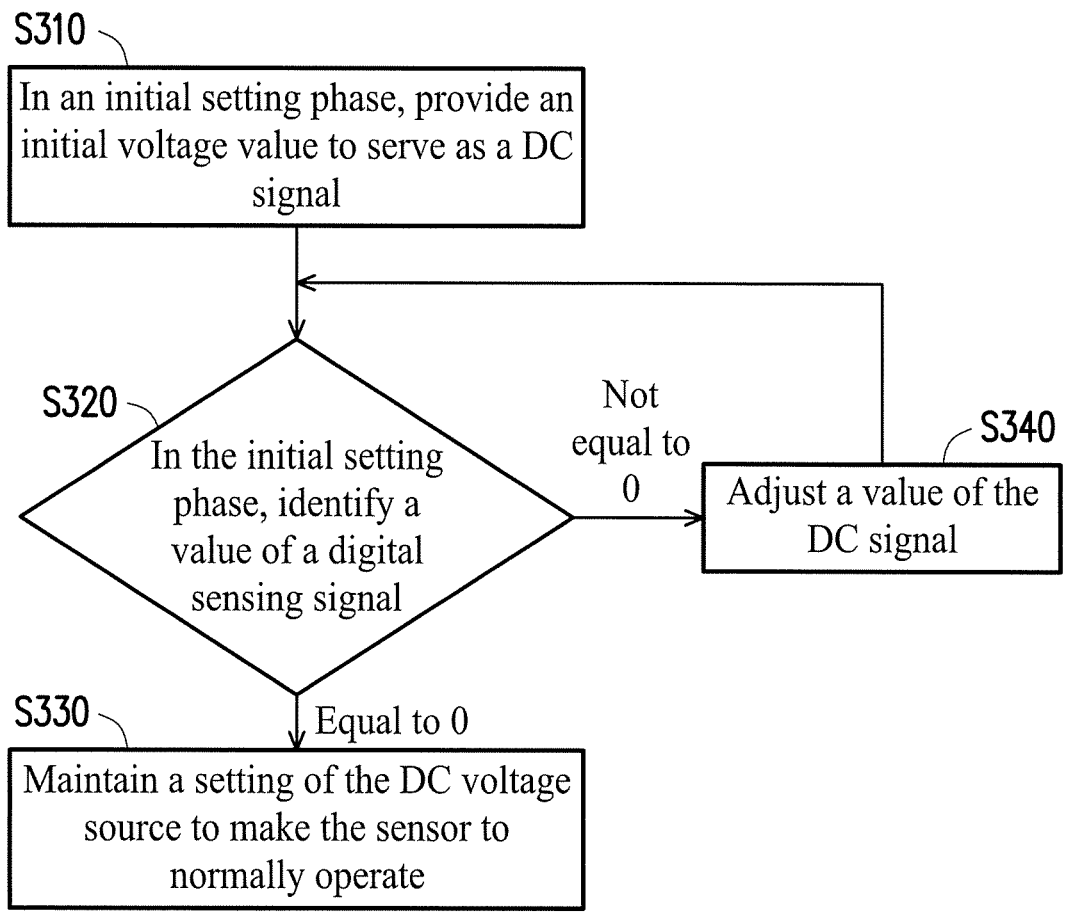
FIG. 3 is a flowchart illustrating an operation method of a feedback circuit according to the first embodiment of the disclosure.

Referring to FIG. 3 for a detailed operation of the feedback circuit 240, and FIG. 3 is a flowchart illustrating an operation method of the feedback circuit 240 according to the first embodiment of the disclosure. In step S310, in the initial setting phase of the readout circuit 110, the feedback circuit 240 controls the DC voltage source 250 by using the feedback signal Sfb to provide an initial voltage value to serve as the DC signal Sdc. In step S320, in the initial setting phase of the readout circuit 110, the feedback circuit 240 identifies a value of the digital sensing signal SDS. If the value of the digital sensing signal SDS is 0, it represents that the DC part in the digital sensing signal SDS may be correctly subtracted from the DC signal Sdc, and in step S330, the setting of the DC voltage source 250 is maintained to make the sensor to normally operate. Comparatively, if the value of the digital sensing signal SDS is not 0, it represents that the DC part in the digital sensing signal SDS cannot be correctly subtracted from the DC signal Sdc, and in step S340, the value of the DC signal Sdc is adjusted, and the flow returns to the step S320 to continually identify whether the value of the digital sensing signal SDS is 0.

Figure 4:
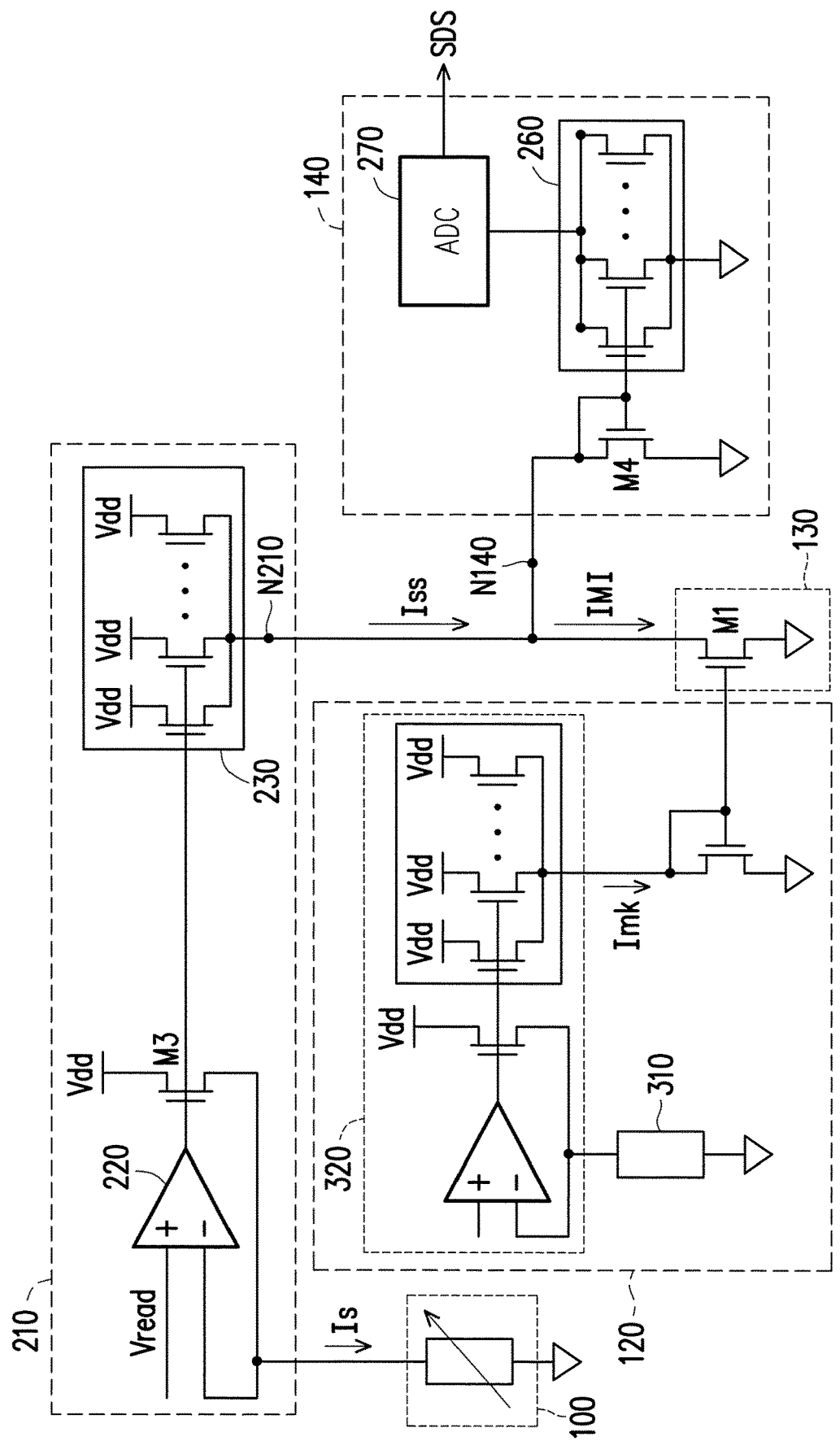
FIG. 4 is a circuit diagram of a readout circuit according to a second embodiment of the disclosure.

FIG. 4 is a circuit diagram of the readout circuit 110 according to a second embodiment of the disclosure. A difference between FIG. 2 and FIG. 4 is that the reference circuit 120 of FIG. 4 includes a mask electrical element 310, a mask readout circuit 320 and a second transistor M2, and the feedback circuit and the DC voltage source are not configured. A value of the mask electrical element 310 is equivalent to an electrical value (i.e. a resistance value R) of the sensor 100 under the non-detecting state. The value of the mask electrical element 310 is not changed along with a variation of the sensed physical quantity. For example, a sensor that is not in contact with the external and is the same with the sensor 100 may serve as the mask electrical element 310. The mask readout circuit 320 is coupled to the mask electrical element 310 to obtain a comparison current from the mask electrical element, and amplifies the comparison current to produce a mask current Imk. Circuit structures of the clamp readout circuit 210 and the mask readout circuit 320 are the same, so as to obtain the more accurate mask current Imk.

A control terminal (a gate) of the second transistor M2 is coupled to the control terminal (the gate) of the first transistor M1 and a first terminal (a drain) of the second transistor M2. A second terminal (a source) of the second transistor M2 is coupled to the ground. In this way, the first transistor M1 and the second transistor M2 form a current mirror (which is referred to as a first current mirror in the embodiment), such that the mask current Imk is taken as the DC current Iss (the DC signal Sdc) for providing to the compensated circuit 130. The circuit structures and functions of the clamp readout circuit 210, the compensated circuit 130 and the signal processing circuit 140 in FIG. 2 and FIG. 4 are all the same.

Figure 5:
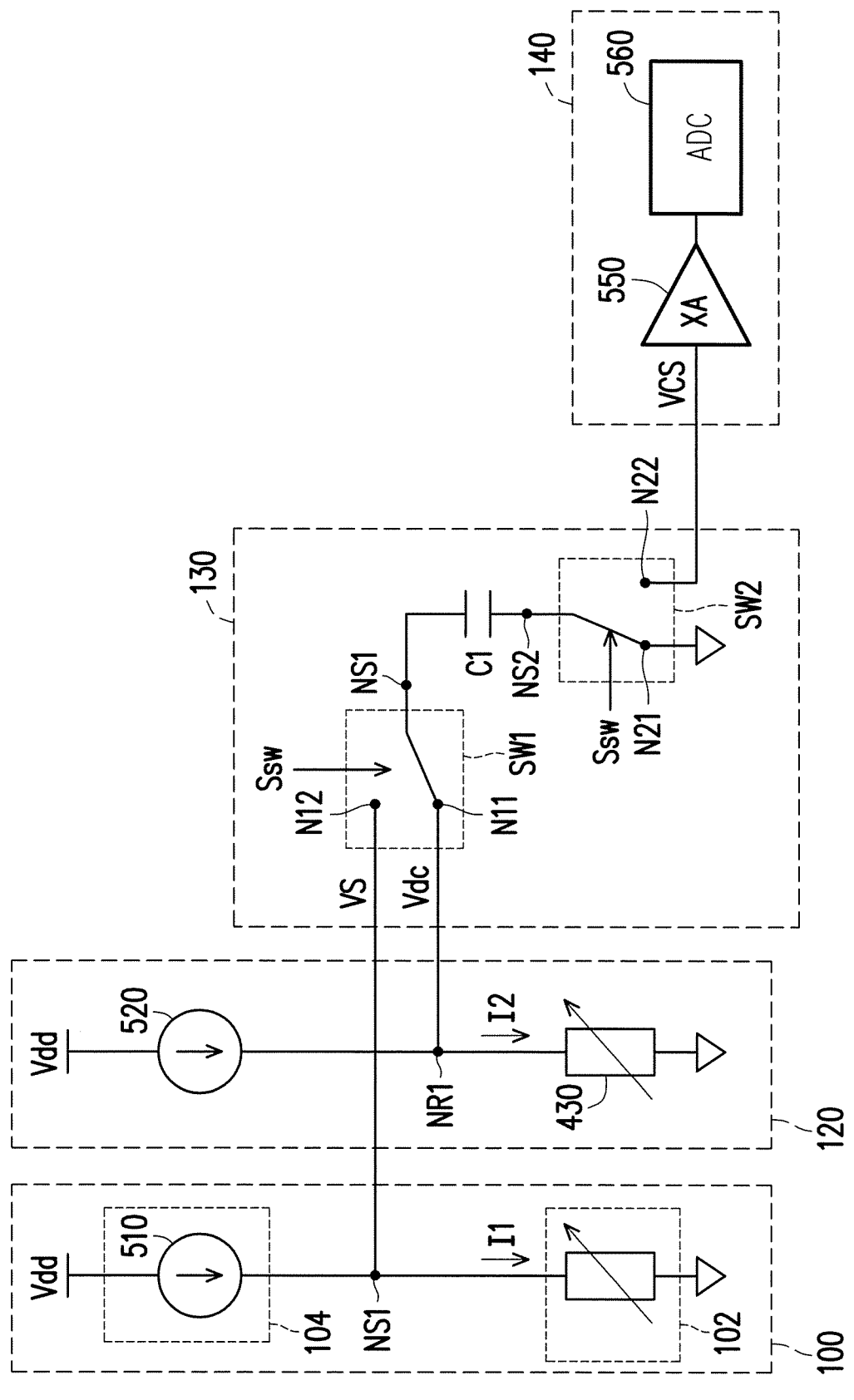
FIG. 5 and FIG. 6 are circuit diagrams of a readout circuit according to a third embodiment of the disclosure.
Figure 6:
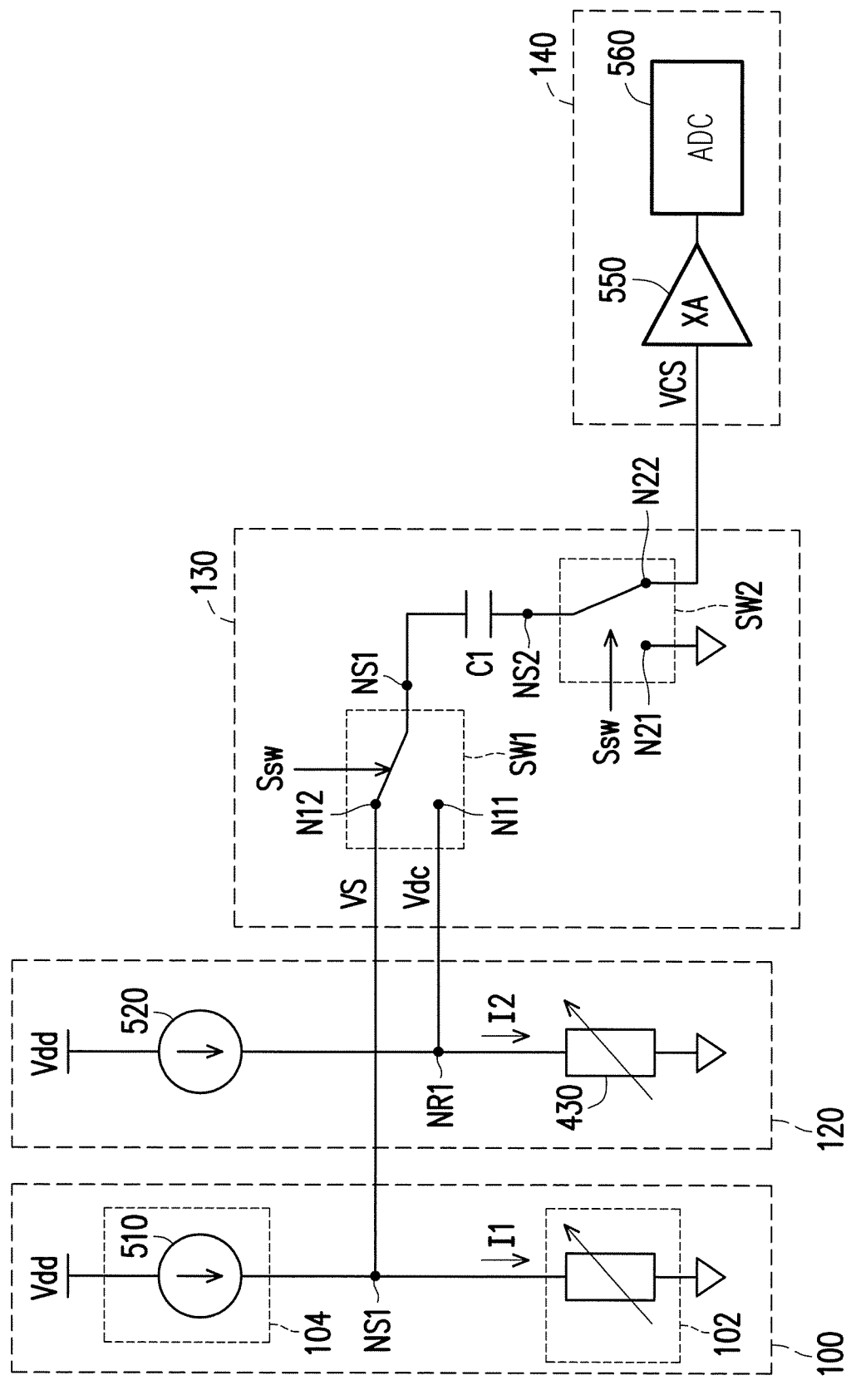

FIG. 5 and FIG. 6 are circuit diagrams of the readout circuit 110 according to a third embodiment of the disclosure. In detail, FIG. 5 is a circuit schematic diagram of the readout circuit 110 when a switching signal is in a first state, and FIG. 6 is a circuit schematic diagram of the readout circuit 110 when the switching signal is in a second state. In the third embodiment of the disclosure of FIG. 5 and FIG. 6, a capacitor is used as a voltage temporary storage device, and switching of switches is adopted to achieve an effect of subtracting the DC signal from the sensing signal. The circuit structures of FIG. 5 and FIG. 6 are the same. The sensor 100 includes a sensing element 102 and a driver 104 implemented by a first current source 510. The first current source 510 is coupled to the sensing element 102 in the sensor 100. An equivalent resistance value of the sensing element 102 is $(R+\Delta R)$. The first current source 510 generates a first current I1. A first terminal NSS1 of the sensor 100 generates a sensing voltage VS to serve as the analog sensing signal SS according to the first current I1. A value of the sensing voltage VS of the present embodiment is $(I1\times(R+\Delta R))$.

The reference circuit 120 includes a second current source 520 and a reference element 430. The reference element 430 is coupled to the second current source 520 to obtain a second current I2. A first terminal NR1 of the reference element 430 provides a DC voltage Vdc to serve as the DC signal Sdc according to the second current I2. The reference element 430 is similar to the mask electrical element 310 of FIG. 4, and a value thereof is equivalent to an electrical value (i.e. the resistance value R) of the sensor 100 under the non-detecting state, and the value of the reference element 430 is not changed along with a variation of an external physical quantity. A value of the DC voltage Vdc of the present embodiment is $(I2\times R)$. In the present embodiment, values of the first current I1 and the second current I2 produced by the first current source I1 and the second current source I2 are set to be the same.

The compensated circuit 130 includes a first switch SW1, a capacitor C1 and a second switch SW2. A first terminal N11 of the first switch SW1 is coupled to the first terminal of the reference element 430, and a second terminal N12 of the first switch SW1 is coupled to the first terminal NSS1 of the sensor 100. A control terminal of the first switch SW1 receives a switching signal Ssw. A first end of the capacitor C1 is coupled to an output terminal NS1 of the first switch SW1. An input terminal NS2 of the second switch SW2 is coupled to a second end of the capacitor C1. A first output terminal N21 of the second switch SW2 is coupled to the ground, and a second output terminal N22 of the second switch SW2 is coupled to an input terminal of the signal processing circuit 140. A control terminal of the second switch W2 receives the switching signal Ssw.

The signal processing circuit 140 includes a voltage amplifier 550 and an analog-to-digital converter (ADC) 560. The voltage amplifier 550 is used for amplifying a compensation voltage Vcs, and an amplification factor thereof is "A". The ADC 270 generates the digital sensing signal SDS according to the amplified compensation voltage.

Referring to FIG. 5, when the switching signal Ssw is in the first state (for example, a logic "0"), the first terminal N11 of the first switch SW1 is electrically connected to the output terminal NS1 of the first switch SW1, and the input terminal NS2 of the second switch SW2 is electrically connected to the first output terminal N21 of the second switch SW2. The first terminal NR1 of the reference element 430 has the DC voltage Vdc, and a value thereof is $(I2\times R)$, one end of the capacitor C1 receives the DC voltage Vdc, and another end of the capacitor C1 is coupled to the ground, and the DC voltage Vdc (the DC signal Sdc) is temporarily stored in the capacitor C1.

Referring to FIG. 6, when the switching signal Ssw is in the second state (for example, a logic "1"), the second terminal N12 of the first switch SW1 is electrically connected to the output terminal NS1 of the first switch SW1, and the input terminal NS2 of the second switch SW2 is electrically connected to the second output terminal N22 of the second switch SW2. The first terminal NSS1 of the sensor 100 has a sensing voltage VS, and a value thereof is $(I1\times(R+\Delta R))$, and the capacitor C1 still stores the DC voltage Vdc with a value of $(I2\times R)$, so that the second output terminal N22 of the second switch S22 generates the compensation voltage Vcs, and a value thereof is $(I\times\Delta R)$. Namely, the compensation voltage Vcs is obtained by subtracting the DC voltage Vdc from the sensing voltage VS. The value I is a value of the current I1 and the current I2. Therefore, the compensation voltage Vcs may amplify a resistance variation amount/the AC part $(\Delta R)$ of the sensor 100 based on value increase of the current, so as to improve the sensitivity of the sensor. When the switching signal is constantly switched back and forth as that does of a clock signal, the readout circuit 110 may opportunely obtain the digital sensing signal SDS.

Figure 7:
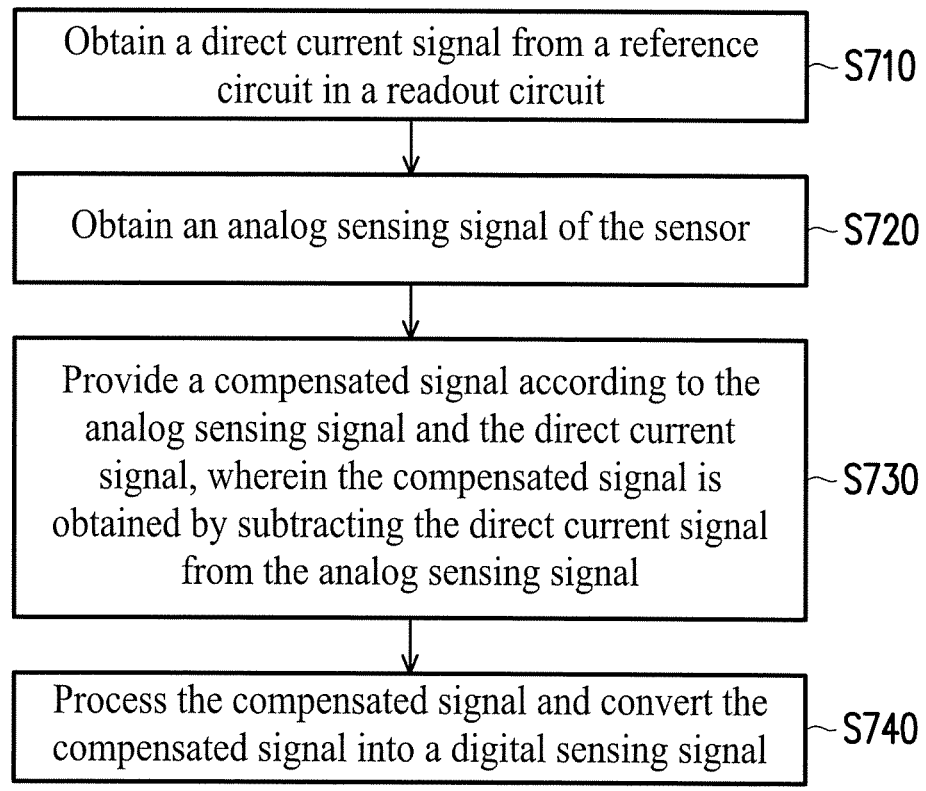
FIG. 7 is a flowchart illustrating a readout method of a sensor according to an embodiment of the disclosure.

FIG. 7 is a flowchart illustrating a readout method of a sensor according to an embodiment of the disclosure. The readout method of FIG. 7 is adapted to the readout circuit of the sensor. Referring to FIG. 1 and FIG. 7, in step S710, the compensated circuit 130 obtains the DC signal Sdc from the reference circuit 120 of the readout circuit 110. In step S720, the compensated circuit 130 obtains the analog sensing signal SS of the sensor 100. In step S730, the compensated circuit 130 provides the compensated signal SCS according to the analog sensing signal SS and the DC signal Sdc, where the compensated signal SCS is obtained by subtracting the DC signal Sdc from the analog sensing signal SS. In step S740, the signal processing circuit 140 processes the compensated signal SCS and converts the same into the digital sensing signal SDS. The aforementioned embodiments may be referred for detailed flows of the above steps.

In summary, the readout circuit for the sensor and the readout method thereof provided by the embodiments of the disclosure may improve sensing signal sensitivity of the sensor by way of subtracting the DC signal (for example, a DC power or a DC voltage) from the sensing signal provided by the sensor. Regarding the above DC signal, a feedback circuit obtains a DC part of the sensing signal obtained by the readout circuit under a state of not detecting a physical quantity (which is referred to as a "non-detecting state") in an initial setting phase of the readout circuit, and the DC signal is modified according to a feedback signal produced by the feedback circuit, so as to intuitively and effectively subtract the DC part from the sensing signal. Moreover, a mask electrical element having a same electrical value with the sensor under the non-detecting state and its accompanying clamp readout circuit may also be adopted to obtain the DC part of the sensing signal. Alternatively, a capacitor is used for temporarily storing the DC signal, and switching of switches is applied to subtract the DC part from the sensing signal. In other words, the embodiment of the disclosure provides three implementations to let the readout circuit to subtract the DC signal from the sensing signal in advance, so as to obtain the sensing signal with the obvious AC part, and accordingly improve the sensitivity of the sensor.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A readout circuit for a sensor, comprising:
a reference circuit, providing a direct current signal;
a compensated circuit, coupled to the reference circuit, obtaining an analog sensing signal of the sensor, obtaining the direct current signal from the reference circuit, and providing a compensated signal according to the analog sensing signal and the direct current signal; and
a signal processing circuit, coupled to the compensated circuit, and processing the compensated signal to convert the compensated signal into a digital sensing signal,
wherein the compensated circuit subtracts the direct current signal from the analog sensing signal to provide the compensated signal.

2. The readout circuit for the sensor as claimed in claim 1, further comprising:
a clamp readout circuit, coupled to the compensated circuit and the sensor, obtaining a sensing current from the sensor, and amplifying the sensing current to produce the analog sensing signal.

3. The readout circuit for the sensor as claimed in claim 2, wherein the compensated circuit comprises:
a first transistor, having a control terminal receiving the direct current signal, a first terminal coupled to an output terminal of the clamp readout circuit and an input terminal of the signal processing circuit, and a second terminal coupled to ground,
wherein the clamp readout circuit provides the analog sensing signal to the first terminal of the first transistor, and the first transistor generates a direct current flowing from the first terminal to the second terminal to serve as the direct current signal, and the input terminal of the signal processing circuit receives the compensated signal,
wherein the compensated signal is obtained by subtracting the direct current from the analog sensing signal.

4. The readout circuit for the sensor as claimed in claim 3, wherein the reference circuit comprises:
a feedback circuit, identifying a direct current part of the digital sensing signal, and generating a feedback signal according to the direct current part; and
a direct current signal source, coupled to the compensated circuit, and controlled by the feedback signal to generate a direct current voltage to serve as the direct current signal.

5. The readout circuit for the sensor as claimed in claim 4, wherein in an initial setting phase of the readout circuit, the feedback circuit identifies the direct current part of the digital sensing signal, and provides the feedback signal according to the direct current part,
in other phases of the readout circuit, a value of the feedback signal is not changed.

6. The readout circuit for the sensor as claimed in claim 4, wherein the reference circuit comprises:
a mask electrical element, having a value equivalent to an electrical value of the sensor under a non-detecting state;
a mask readout circuit, coupled to the mask electrical element, obtaining a comparison current from the mask electrical element, and amplifying the comparison current to produce a mask current, wherein circuit structures of the clamp readout circuit and the mask readout circuit are the same; and
a second transistor, having a control terminal coupled to the control terminal of the first transistor and a first terminal of the second transistor, and a second terminal coupled to the ground, wherein the first transistor and the second transistor form a first current mirror to take the mask current as the direct current signal for providing to the compensated circuit.

7. The readout circuit for the sensor as claimed in claim 3, wherein the clamp readout circuit comprises:
an operational amplifier, having a non-inverting input terminal receiving a readout voltage, and an inverting input terminal coupled to the sensor;
a third transistor, having a control terminal coupled to an output terminal of the operational amplifier, a first terminal receiving a power voltage, and a second terminal coupled to the inverting input terminal of the operational amplifier to obtain the sensing current; and
a first current amplifier, having a control terminal coupled to the control terminal of the third transistor, and a first terminal coupled to the power voltage, wherein the third transistor and the first current amplifier form a second current mirror to generate the analog sensing signal according to the sensing current.

8. The readout circuit for the sensor as claimed in claim 7, wherein the signal processing circuit comprises:
a fourth transistor, having a first terminal and a control terminal coupled to the compensated circuit to obtain the compensated signal, and a second terminal coupled to ground;
a second current amplifier, having a control terminal coupled to the control terminal of the fourth transistor, and a second terminal coupled to the ground, wherein the fourth transistor and the second current amplifier form a third current mirror to generate an amplified compensated signal according to the compensated signal; and
an analog-to-digital converter, coupled to the second current amplifier to generate the digital sensing signal according to the amplified compensated signal.

9. The readout circuit for the sensor as claimed in claim 1, further comprising:
a first current source, coupled to the sensor,
wherein the first current source generates a first current, and a first terminal of the sensor provides the analog sensing signal according to the first current,
wherein the reference circuit comprises:
a second current source; and
a reference element, coupled to the second current source to obtain a second current, and a first terminal of the reference element providing the direct current signal according to the second current, wherein a value of the reference element is equal to an electrical value of the sensor under a non-detecting state, and the value of the reference element is not changed along with a change of an external physical quantity.

10. The readout circuit for the sensor as claimed in claim 9, wherein the compensated circuit comprises:

a first switch, having a first terminal coupled to the first terminal of the reference element, a second terminal coupled to the first terminal of the sensor, and a control terminal receiving a switching signal;

a capacitor, having a first end coupled to an output terminal of the first switch; and a second switch, having an input terminal coupled to a second end of the capacitor, a first output terminal coupled to the ground, a second terminal coupled to an input terminal of the signal processing circuit, and a control terminal receiving the switching signal, wherein when the switching signal is in a first state, the first terminal of the first switch is electrically connected to the output terminal of the first switch, and the input terminal of the second switch is electrically connected to the first output terminal of the second switch, such that the direct current signal is temporarily stored in the capacitor, when the switching signal is in a second state, the second terminal of the first switch is electrically connected to the output terminal of the first switch, and the input terminal of the second switch is electrically connected to the second output terminal of the second switch, so as to generate the compensated signal at the second output terminal of the second switch, wherein the compensated signal is obtained by subtracting the direct current signal from the analog sensing signal.

11. The readout circuit for the sensor as claimed in claim 10, wherein the switching signal is a clock signal.

12. A readout method for a sensor, adapted to a readout circuit for the sensor, the readout method comprising:
   obtaining a direct current signal from a reference circuit in the readout circuit;
   obtaining an analog sensing signal of the sensor;
   providing a compensated signal according to the analog sensing signal and the direct current signal, wherein the compensated signal is obtained by subtracting the direct current signal from the analog sensing signal; and
   processing the compensated signal and converting the compensated signal into a digital sensing signal.

13. The readout method for the sensor as claimed in claim 12, wherein the step of obtaining the direct current signal comprises:
   in an initial setting phase, identifying a direct current part of the digital sensing signal, and generating a feedback signal according to the direct current part; and
   generating a direct current voltage to serve as the direct current signal according to the feedback signal.

14. The readout method for the sensor as claimed in claim 13, wherein the step of obtaining the direct current signal comprises:
   in other phases except the initial setting phase, not changing a value of the feedback signal.

15. The readout method for the sensor as claimed in claim 12, wherein the reference circuit comprises:
   a mask electrical element, having a value equivalent to an electrical value of the sensor under a non-detecting state;
   a mask readout circuit, coupled to the mask electrical element, obtaining a comparison current from the mask electrical element, and amplifying the comparison current to produce a mask current, wherein circuit structures of a clamp readout circuit and the mask readout circuit are the same; and
   a second transistor, having a control terminal coupled to a control terminal of a first transistor of a compensated circuit and a first terminal of the second transistor, and a second terminal coupled to the ground, wherein the first transistor and the second transistor form a first current mirror to take the mask current as the direct current signal for providing to the compensated circuit.

16. The readout method for the sensor as claimed in claim 12, wherein the step of providing the compensated signal according to the analog sensing signal and the direct current signal comprises:
   when the switching signal is in a first state, temporarily storing the direct current signal in a capacitor; and
   when the switching signal is in a second state, subtracting the direct current signal in the capacitor from the analog sensing signal to obtain the compensated signal.

* * * * *